United States Patent [19]

Slater et al.

[11] 3,928,221
[45] Dec. 23, 1975

[54] SNOW AND ICE CONTROL COMPOSITIONS

[75] Inventors: Jack D. Slater; William G. H. Latham; Robert H. Farrow, all of Savannah, Ga.

[73] Assignee: Kaiser Aluminum & Chemical Corporation, Oakland, Calif.

[22] Filed: Aug. 15, 1973

[21] Appl. No.: 388,482

[52] U.S. Cl. .................. 252/70; 252/389; 252/391; 106/13
[51] Int. Cl.² ............................................ C09K 3/18
[58] Field of Search .......... 252/70, 389, 391; 106/13

[56] References Cited
UNITED STATES PATENTS

| | | | |
|---|---|---|---|
| 3,185,648 | 5/1965 | Standish et al. | 252/70 |
| 3,245,912 | 3/1966 | White | 252/70 |
| 3,624,243 | 11/1970 | Scott et al. | 252/70 |
| 3,756,956 | 9/1973 | Paunsch | 252/70 |

OTHER PUBLICATIONS

McCutcheon, "Detergents & Emulsifiers Annual" Allured Publishing Corp. Ridgewood, N.J. 1970, p. 216.

*Primary Examiner*—Benjamin R. Padgett
*Assistant Examiner*—Josephine Lloyd
*Attorney, Agent, or Firm*—Paul E. Calrow; Andrew E. Barlay

[57] ABSTRACT

A biodegradable, aqueous, snow and ice control composition, having as active ingredient a mixture of urea, ethylene glycol and methanol and possessing a salting out temperature (SOT) down to about −40°C (−40°F) is provided for maintaining roads, airport runways and strip mining soil surfaces free of ice and snow for extended periods.

10 Claims, No Drawings

SNOW AND ICE CONTROL COMPOSITIONS

BACKGROUND OF THE INVENTION

Snow and ice can create hazardous conditions on roads, airport runways and many attempts have already been made to alleviate these problems. Also, most strip mining operations must cease during severe winters due to freezing of the top soil layer, in many instances to considerable depths, which renders the operation of mining equipment not only impractical, but sometimes impossible. Snow and ice control compositions, commonly called deicers, to be successful in controlling ice and snow problems, must meet many criteria, the most important of these being low salting out (SOT) temperature, low toxicity and corrosivity, easy handling and application; and a high degree of effectiveness, generally measured by the quantity of deicer required to maintain a certain area ice and snow-free for a given period. With increasing concern about the effect of deicers on the environment, biodegradability without toxic residual effect has become an additional significant requirement. Thus, chemical deicers to be acceptable for use in areas where contact with living beings and vegetation is expected, must also exhibit this aforementioned characteristic.

Commercially used chemical deicers, for example, formamide-urea compositions containing from about 60% by weight formamide, such as described in U.S. Pat. No. 3,108,075, provide sufficiently low salting out temperatures, however, the use of formamide in high concentrations presents severe problems, as far as toxic effects are concerned. Formamide in high concentrations, among others, exerts an irritating effect on skin and mucus membranes thus its handling itself must be conducted under carefully controlled conditions. Once applied to, for example, airport runways or road surfaces, formamide remains relatively stable under the usually encountered environmental conditions and its decomposition to harmless residual products requires extended time periods. From the time of preparation and application to complete decomposition living beings can be exposed to the undesirable effects of high concentrations of formamide, thus creating an undesirable environmental effect.

In recognition of some of the hazards involved in the use of formamide in high concentrations, deicing compositions free of formamide have been recommended. For example, as set forth in U.S. Pat. No. 3,630,913, a combination of urea, ammonium nitrate and ethylene glycol in aqueous medium has been used as deicer. While this composition omits the use of formamide, its salting out temperature is in the range of about −27°C to 0°C (−16.6°F to 32°F), which limits the use to areas not encountering severe winter conditions, thus reducing the general applicability of this deicer.

Other chemical deicers, such as urea alone, ethylene glycol with or without aliphatic lower alcohols, have been employed, but in general these deicers fail to meet one or more of the strict requirements prescribed for snow and ice controls.

It has now been discovered that a chemical snow and ice control composition having as active ingredient a mixture of urea, ethylene glycol and methanol satisfies the rigid criteria required and desired from such compositions.

SUMMARY OF THE INVENTION

A biodegradable, aqueous snow and ice control composition containing as active ingredient a mixture of about 23 to about 25% by weight urea, about 11 to about 15% by weight ethylene glycol and about 35 to about 40% by weight methanol is provided for roadways, airport runways and for strip mining soil surfaces. The composition possesses a salting out temperature (SOT) range of about −30°C to about −40°C, an alkali adjusted pH from about 8.1 to 8.4 and a long shelf life. The composition possesses a long active life after application without harmful effects on the environment. When admixed with generally employed ice abraders, such as sand or small gravel, in a sprayable consistency, its snow and ice control effect is substantially increased due to a combined mechanical and chemical deicing action.

DETAILED DESCRIPTION OF THE INVENTION

This invention relates to a biodegradable snow and ice control composition for maintaining snow and ice-free roadway, airport runway and strip mining soil surfaces for extended periods.

More particularly, the present invention concerns an aqueous, biodegradable snow and ice control composition, wherein the active ingredient is a mixture of urea, ethylene glycol and methanol and which possesses a salting out temperature (SOT) of about −40°C.

For the purposes of this invention the term "snow and ice control" refers to the following characteristics of the novel composition:

a. capability of melting snow and ice at temperatures down to about −40°C (−40°F);

b. capability of preventing snow and ice formation on surfaces when presprayed with the composition at temperatures down to about −40°C (−40°F); and c. capability of maintaining melted snow and ice in the molten state down to the temperature indicated.

The novel snow and ice control composition, which has a salting out temperature range of about −30°C to about −40°C (−22.0°F to −40°F) contains as active ingredient a mixture of the following constituents within the limits indicated:

urea: about 23–25% by weight
ethylene glycol: about 11–15% by weight
methanol: about 35–40% by weight.

This composition is generally employed in an aqueous dispersion or solution wherein about 65 to 80 parts by weight of mixture is mixed with about 20–35 parts by weight of water. To obtain minimum corrosivity, spalling, or degradation and extended use life when applied to surfaces to be kept free of ice or snow, it is recommended to adjust the pH of the aqueous mixture to about 8.1–8.4 by the addition of an alkaline compound, preferably ammonia or ammonium hydroxide.

The aqueous composition described above can be easily prepared, for example, by first admixing methanol, ethylene glycol and water, followed by the addition of urea preferably under agitation. If desired, the pH of the aqueous composition is then adjusted to the values indicated above.

While the snow and ice control composition of the present invention is substantially non-corrosive, as the data in the Examples below indicate, for some applications, particularly when it is expected that the composition may contact sensitive metal or plastic parts of aircraft, it is desirable to incorporate an anticorrosion agent in the composition. The anticorrosion agent employed for this purpose can be suitably selected from the known agents, however, it has been found that particularly good results can be achieved in terms of corrosion prevention by addition of a small quantity of a mixture of sodium oleate and the sodium salt of sulfonated oleic acid such as described in U.S. Pat. 3,756,956 to E. Panusch. The quantity of anticorrosion agent to be incorporated in the snow and ice control composition generally ranges from about 0.2 to about 2% by weight of the mixture of urea-ethylene glycolmethanol.

The snow and ice control composition of the present invention is generally applied to road and airport runways in an aqueous media, however, a water-free solution can also be employed. Due to the low viscosity of the aqueous solution, it can be readily sprayed on the surfaces to be controlled. For strip mining soil surfaces and for stockpiles of already mined ores and coal, the instant snow and ice control composition can also be either employed in concentrated form or if desired in aqueous solution. Utilization of the snow and ice control composition in either concentrated or in aqueous form depends on the temperatures encountered and on the economy of the application. Thus, where temperatures down to about −40°C are expected it is recommended to use the aqueous composition which possesses a salting out temperature (SOT) of about −40°C.

It has also been discovered that the novel snow and ice control composition can be readily admixed with sand and/or small size gravel, which are conventionally employed as ice abraders and traction improvers for icy roads. The mixture of the instant composition with sand and/or gravel provides the following unexpected results. Traction of vehicle wheels due to the mechanical (abrasive) action of sand and/or gravel is manyfold improved by the presence of the instant snow and ice control composition, since aside from the mechanical action, the snow and ice control composition, even under severe winter conditions, causes ice and snow to melt and prevents ice formation down to about −40°C. Admixture of the snow and ice control composition with sand and/or gravel prolongs the effective life of the snow and ice control composition; larger areas can be treated with the admixture due to the diluting effect of the sand and/or gravel with improved economy. Lastly, the mixture of sand and/or gravel with the instant snow and ice control composition provides a virtually corrosion-free surface treating agent, in contrast to the conventionally employed salt or calcium chloride-sand mixtures, which cause considerable damage to vehicles due to the corrosive effects of the deicer added to the sand. An additional advantage of the instant sand-snow and ice control composition is in the ease of mixing these components. The aqueous snow and ice control composition can be readily sprayed on the sand or gravel, no involved mixing equipment is required to achieve uniform distribution which is generally the case when sand-calcium chloride mixtures are being prepared.

The following examples will further illustrate the properties and modes of application of the novel snow and ice control composition.

EXAMPLE I

An aqueous snow and ice control composition of about 14.000 kg was prepared by admixing 5320 kg methanol, 1680 kg ethylene glycol and 3500 gk water containing sufficient $NH_4OH$ to set the pH of the final composition to 8.3 ± 0.2. Subsequently, 3360 kg urea was added under agitation, followed by the incorporation of 140 kg anticorrosion agent comprising a mixture of sodium oleate (30% by weight) and the sodium salt of sulfonated oleic acid (70% by weight). The composition had a density of 1.00 kg/l (8.4 lbs/gallon) and a salting out temperature of about −40°C (−40°F).

This composition was loaded into tank trucks equipped with spraying equipment and then sprayed on a snow covered highway including bridges at a rate of about 1 liter/24.6m$^2$ road surface. The application of this snow and ice control composition maintained the road surface free of ice and snow for a period of 3-8 days even under weather conditions of high humidity and at temperatures in the neighborhood of −10° to −20°C (−14.0° to −4.0°F).

The corrosivity of the snow and ice control composition described above without, however, the anticorrosion agent, was tested according to NACE Test Method 01−69 and no visible attack has been found on aluminum, zinc, steel, chromium plated parts and neoprene rubber after a 7-day exposure by immersion of these materials in the composition kept at 37.8°C.

EXAMPLE II 2430 kg of the above aqueous snow and ice control composition was admixed with sand, such as usually employed for road traction improvement purposes, at a rate of 300 kg composition per 8 metric tons of sand. The mixture was then loaded on spreader trucks, usually employed for spreading sand with salt (NaCl) on highways. The highway to be treated was covered with approximately 2.4 cm (1 inch) snow and the application of the mixture proceeded during a snowstorm. Spinner-type distributors on the trucks spread the admixture across the entire width of the highway (10.6m width) at the same rate as is usually employed with sand-salt mixtures. For comparison purposes a section of the highway was also spread with a mixture of sand and and sodium chloride. The highway sprayed with the novel composition remained snow and ice-free for a 2–5 day period, while the highway sprayed with the sand-salt mixture had numerous icy spots during the same period, resulting in several traffic accidents. In contrast, no traffic accidents were reported due to icy conditions on that section of the highway which had been treated with the snow and ice control composition of the instant invention.

EXAMPLE III

The same composition shown in Example I but without the anticorrosion agent was sprayed on coal stockpiles loaded in open railroad cars. Even at temperatures in the range of −10° to −°30°C (−14.0° to −22°F), the coal, regardless of the moisture on its surface remained unfrozen, which allowed its unloading without difficulty. Coal, without treatment with the novel composition become solidly frozen into large lumps and this made it virtually impossible to unload by conventional means, without breaking up the frozen lumps.

What is claimed is:

1. An aqueous snow and ice control composition containing as active ingredient a mixture of about 23 to about 25% by weight urea, about 11 to about 15% by weight ethylene glycol, about 35 to about 40% by weight methanol, balance water, with a sufficient quantity of alkali to adjust the pH of the composition from about 8.1 to about 8.4, characterized by a salting out temperature range of about −30°C to about −40°C.

2. Composition of claim 1, where an anticorrosion agent is added in a quantity equivalent to about 0.2 to 2% by weight of the active ingredient.

3. Composition of claim 2, wherein the anticorrosion agent is a mixture of sodium oleate and the sodium salt of sulfonated oleic acid.

4. Composition of claim 3, wherein the mixture contains about 30% by weight sodium oleate, balance the sodium salt of sulfonated oleic acid.

5. Composition of claim 1, in admixture with sand.

6. Composition of claim 1 in admixture with gravel.

7. A process for controlling snow and ice on surfaces selected from roads, airport runways, strip mining soils, stockpiles of ores and coal which comprises applying to the surface an aqueous composition containing as active ingredient a mixture of about 23 to about 25% by weight urea, about 11 to about 15% by weight ethylene glycol, about 35 to about 40% by weight methanol, balance water, with a sufficient quantity of alkali to adjust the pH of the composition from about 8.1 to about 8.4.

8. Process of claim 7, wherein the composition contains from about 0.2 to about 2% by weight, based on the weight of the active ingredient, an anticorrosion agent.

9. Process of claim 8, wherein the anticorrosion agent is a mixture of sodium oleate and the sodium salt of sulfonated oleic acid.

10. A process for controlling snow and ice on road surfaces which comprises applying to the surfaces sand in combination with a composition containing as active ingredient a mixture of about 23 to about 25% by weight urea, about 11 to about 15% by weight ethylene glycol, about 35 to about 40% by weight methanol, balance water with a sufficient quantity of an alkali to adjust the pH of the composition from about 8.1 to about 8.4.

* * * * *